US010659456B2

(12) United States Patent
Vanoni et al.

(10) Patent No.: US 10,659,456 B2
(45) Date of Patent: May 19, 2020

(54) METHOD, DEVICE AND COMPUTER PROGRAM FOR AUTHENTICATING A USER

(71) Applicant: BIOWATCH SA, Switzerland (CH)

(72) Inventors: Matthias Vanoni, Switzerland (CH); Joseph Rice, United Kingdom (GB)

(73) Assignee: Biowatch SA, Martigny (CH)

( * ) Notice: Subject to any disclaimer, the term of this patent is extended or adjusted under 35 U.S.C. 154(b) by 26 days.

(21) Appl. No.: 15/399,553

(22) Filed: Jan. 5, 2017

(65) Prior Publication Data
US 2017/0339137 A1 Nov. 23, 2017

(30) Foreign Application Priority Data

May 20, 2016 (EP) .................................... 16170709

(51) Int. Cl.
*H04L 29/06* (2006.01)
*H04N 5/232* (2006.01)
(Continued)

(52) U.S. Cl.
CPC .......... *H04L 63/0861* (2013.01); *G06F 21/32* (2013.01); *G06K 9/00382* (2013.01); *G06K 9/00885* (2013.01); *G06K 9/00906* (2013.01); *G06K 9/00912* (2013.01); *G06T 7/0012* (2013.01); *G06T 7/73* (2017.01); *G06T 11/60* (2013.01); *H04N 5/2252* (2013.01);
(Continued)

(58) Field of Classification Search
CPC ....... H04L 63/0861; G06T 7/73; G06T 11/60; G06T 2207/10004; G06T 2207/20221; G06T 2207/30101; G06K 9/00382; G06K 9/00906; G06K 9/00912; H04W 12/06
See application file for complete search history.

(56) References Cited

U.S. PATENT DOCUMENTS 9,996,758 B2 * 6/2018 Rice .......................... A45F 5/00
2007/0253602 A1 11/2007 Amano
(Continued)

FOREIGN PATENT DOCUMENTS

EP 2413263 A1 2/2012
EP 2701097 A2 2/2014
(Continued)

*Primary Examiner* — Matthew T Henning
(74) *Attorney, Agent, or Firm* — Blank Rome LLP

(57) ABSTRACT

A device and method for authenticating a user of a wearable biometric device. The method involves performing an initial biometric authentication of the user, the authentication being based on biometric features extracted from one or more image frames corresponding to a first portion of the user's hand and/or wrist, captured with a camera of a wearable device. A second part of the authentication method involves either re-confirming the initial biometric authentication of the user or verifying the liveness of the user or both re-confirming the authentication and verifying the liveness. The second step of the method is based on at least a measure of a second portion of the user's hand or wrist taken when the wearable device is worn against the user's hand or wrist. A notable part of the method is that the initial biometric authentication is performed by temporarily moving the camera away from the first portion of the user's hand and/or wrist.

25 Claims, 2 Drawing Sheets

(51) Int. Cl.
*H04N 5/235* (2006.01)
*H04N 5/225* (2006.01)
*H04N 5/33* (2006.01)
*G06F 21/32* (2013.01)
*G06T 7/73* (2017.01)
*G06K 9/00* (2006.01)
*G06T 11/60* (2006.01)
*H04W 12/06* (2009.01)
*G06T 7/00* (2017.01)

(52) U.S. Cl.
CPC ........... *H04N 5/2256* (2013.01); *H04N 5/232* (2013.01); *H04N 5/2354* (2013.01); *H04N 5/23232* (2013.01); *H04N 5/33* (2013.01); *H04W 12/06* (2013.01); *G06F 2221/2139* (2013.01); *G06K 2009/00932* (2013.01); *G06T 2207/10004* (2013.01); *G06T 2207/20221* (2013.01); *G06T 2207/30101* (2013.01)

(56) References Cited

U.S. PATENT DOCUMENTS

| | | | | |
|---|---|---|---|---|
| 2011/0163163 A1* | 7/2011 | Rowe | ................ | G06K 9/00046 235/462.25 |
| 2012/0307031 A1* | 12/2012 | Aoki | ................ | G06K 9/00382 348/77 |
| 2013/0089240 A1* | 4/2013 | Northcott | ........... | G06K 9/00604 382/117 |
| 2013/0272586 A1* | 10/2013 | Russo | ................ | G06K 9/00087 382/124 |
| 2014/0118519 A1* | 5/2014 | Sahin | ................ | G06K 9/00912 348/77 |
| 2014/0118520 A1* | 5/2014 | Slaby | ................ | G06K 9/00926 348/77 |
| 2015/0135310 A1 | 5/2015 | Lee | | |
| 2015/0223731 A1* | 8/2015 | Sahin | ...................... | A61B 5/16 600/301 |
| 2015/0253886 A1* | 9/2015 | Wei | ......................... | G06F 3/041 345/173 |
| 2015/0304322 A1* | 10/2015 | Zaidi | ................ | G06K 9/00892 382/115 |
| 2015/0342542 A1* | 12/2015 | An | ......................... | A61B 5/747 455/404.2 |
| 2015/0347833 A1* | 12/2015 | Robinson | ............... | G01B 11/25 348/77 |
| 2016/0132711 A1* | 5/2016 | Setterberg | .......... | G06K 9/00926 382/124 |
| 2016/0171324 A1* | 6/2016 | Ionita | ................... | G06K 9/4614 382/117 |
| 2016/0224779 A1 | 8/2016 | Kitane | | |
| 2016/0283808 A1* | 9/2016 | Oganezov | .......... | G06K 9/00885 |
| 2016/0314468 A1* | 10/2016 | Smith | ................... | G07F 7/1041 |

FOREIGN PATENT DOCUMENTS

| | | |
|---|---|---|
| WO | WO 2015/098384 A1 | 7/2015 |
| WO | WO 2016/018083 A1 | 2/2016 |

\* cited by examiner

METHOD, DEVICE AND COMPUTER PROGRAM FOR AUTHENTICATING A USER

RELATED APPLICATIONS

This application claims priority of European Patent Application EP16170709.6 filed on May 20, 2016, the content of which is hereby incorporated by reference.

It is also related to U.S. application Ser. No. 15/207,177 filed on Jul. 11, 2016, the content of which is hereby incorporated by reference.

FIELD OF THE INVENTION

The present invention concerns a method, a device and a computer program for authenticating a user of a wearable device, in particular for authenticating a user by using images of blood vessels, e.g. hand and/or wrist blood vessels, of the user.

DESCRIPTION OF RELATED ART

Biometrics is widely used in order to authenticate or identify users. Biometrics is often based on fingerprint, voice, retina, iris, palm, face or wrist vessel recognition. The present application is related to biometric sensors used for authenticating or identifying users based on patterns on the hand or wrist, in particular patterns of blood vessels in the hand and/or in the wrist of a user.

The document WO2016018083 describes a wearable apparatus for authenticating a user and comprising a camera, wherein images of blood vessels, in particular hand or wrist blood vessels, of the user are captured when the camera is at a fixed distance from those blood vessels. In one example, those images are captured when the user wears the device.

In this position, the captured area of the blood vessels is small and limited to the field of view of the camera. This zone is much smaller than the biometric significant area crossed by blood vessels through the hand back, hand palm and/or wrist. As a consequence, only a fraction of the biometric information related to the blood vessels in the user's hand or wrist is used, and the reliability of this authentication method is limited.

An aim of the present invention is to obviate or mitigate at least some drawbacks of the state of the art.

Another aim of the present invention is to propose a method and a device for authenticating a user in a more secure and reliable way than known solutions.

BRIEF SUMMARY OF THE INVENTION

According to the invention, these aims are achieved by means of a method for authenticating a user comprising:
- an initial biometric authentication of the user, based on biometric features extracted from one or a plurality of image frames corresponding to a first portion of the user's hand and/or wrist, captured with a camera of a wearable device;
- a subsequent step of confirming said biometric authentication of the user and/or verifying his liveness, based on at least a measure of a second portion of the user's hand or wrist taken when said wearable device is worn against the user's hand or wrist;
- the surface of said second portion being smaller than the surface of said first portion.

The noun "image" in this context has a broad meaning so as to encompass different concepts. An image could correspond to a visible phenomenon, for example a reproduction in a visible range of what a human or visible length sensor would see, or to something not visible, for example a reproduction of values captured by a sensor such as an infrared sensor, a near-infrared sensor, a temperature sensor, etc.

The images may represent portions of the user's body captured from various distances, for example a portion of the user's palm, hand back and/or wrist. The images may include the skin of those portions, and/or blood vessels under the skin.

"Images frames" are data generated by an imaging sensor when the sensor captures the images. Images frames could be stored as tif files, jpeg files, raw files, part of MPEG files, or any other suitable file format for storing image data. A single image frame may correspond to a still image. Video data comprises a series of image frames.

The camera may be moved between successive frames of a video sequence. Different frames used in a same authentication step may be captured from different viewpoints relatively to the user's hand or wrist.

Capturing images frames during the initial authentication step, the camera may be at a distance from the imaged portion of the user's body, for example a distance equal or higher than 10 mm, preferably larger than 50 mm. This allows collecting information about a portion of the user larger than the area that would be captured by a camera near or in contact with the user.

Moving the camera over the blood vessels during the initial authentication step allows capturing an even larger portion, i.e. to collect more information about the blood vessels of the user. This makes the matching with features of a reference image more reliable, since more features are extracted from a larger pattern of blood vessels. Therefore, the authentication of the user can be more reliable than known solutions with a camera at a fixed and close distance to the user's body.

The initial biometric authentication could be performed while the user is donning the wearable device. Several image frames of the user's hand and/or wrist may be captured when the user is donning the wearable device.

Alternatively, or in addition, the initial biometric authentication could be performed by temporarily moving the camera away from the imaged portion, for example by temporarily stretching or opening a wrist of the wearable device during the capture.

The subsequent step of confirming the authentication or verifying the liveness may be executed while the user wears the device, with the wearable device at a closer distance from the imaged portion and from the blood vessels. In one embodiment, the second distance is smaller than 10 mm, preferably smaller than 5 mm. In one preferred embodiment, the confirming step is executed when the wearable device is worn in contact with the user's skin, for example in normal use.

The camera may be moved during the capture of the image frames used for the initial biometric authentication. Therefore, its position with regard to the blood vessels and/or to the other biometric features changes over time. In one embodiment, its distance to the blood vessels changes also over time. Alternatively or complementary to the previous embodiment, the orientation of the camera with regard to the blood vessels may change over time.

In one preferred embodiment, the wearable device is a wristwatch. The camera may be mounted on the case, on the dial, on the bezel and/or on a button of this wristwatch. In another embodiment, it is mounted on a clasp of the wristwatch. In still another embodiment, the wristwatch comprises a wrist strap, such as an elastic wrist wrap, and the camera can be mounted on this wrist strap or on an auxiliary device attached to of the wrist strap.

In another embodiment, the wearable device is a wrist strap (without watch), for example a bracelet or an activity tracker. In this case, the wrist strap can be elastic and the camera can be mounted on this elastic wrist strap. The wrist strap can comprise—in addition or in alternative—a clasp: in this case, the camera can be mounted on this clasp. The wrist strap can comprise in addition or in alternative an auxiliary attachment: in this case, the camera can be mounted on this auxiliary attachment.

In one preferred embodiment, the camera of the wearable device according to the invention is arranged so as to treat images captured at different distances and/or orientations with regard to the pattern of blood vessels. In other words, the camera allows capturing images with different focal distance. It can be a multi-focal camera.

A single camera with a large focal range may be used. Preferably, the depth of field of the camera is sufficient for capturing focused images in a range from 10 mm to 50 mm at least. This allows for the capture of images from different distances during the initial authentication step.

In one embodiment, a single camera is used for the initial authentication step and as the second sensor for the subsequent confirming step. In this specific example, the depth of field of the camera may be sufficient for capturing focused images of the blood vessels when the camera is at a relatively large distance of the blood vessels, for example when the user is donning the wristwatch device, and focused images of the blood vessels when the camera is at a closer distance of the blood vessels when the user is wearing the wrist-worn device.

The focal distance of the camera may be changed between the initial authentication step and the confirming step.

One camera with a first focal distance may be used for the initial authentication, and a different camera with a shorter focal distance may be used for the subsequent confirmation.

In one preferred embodiment, the method according to the invention comprises the step of stitching different image frames corresponding to different portions of the user.

In one preferred embodiment, the stitching comprises the correction of the orientation of frames captured from different point of views and/or with different orientations.

In one preferred embodiment, the stitching comprises the step of resizing frames captured from different viewpoints and/or different distances to imaged portion.

The wearable device may comprise a computer vision software module arranged so as to perform at least one of the above-mentioned stitching step.

In one preferred embodiment, the method according to the invention comprises the step of indicating to the user, during or after the initial biometric authentication, that the quality of the captured images frames is not sufficient and/or that the imaged portion should be completed by capturing additional image frames.

For example, the device can comprise indicating means, e.g. visual means such as a display or LED, audio means and/or vibrating means indicating to the user that it is necessary to capture at least one additional image frame, until a sufficient portion of the user's hand or wrist has been captured with a sufficient quality.

For example, the wearable device may comprise a pointer for indicating to the user one of the two above-mentioned portions. In one preferred embodiment, the wearable device comprises a light source illuminating the missing portion, for example by projecting light spots or circles on this portion. In one embodiment, the wearable device comprises audio means communicating to the user an audio signal indicating that it is necessary to capture or re-capture an image frame. In one embodiment, the captured portion, or the missing portion, is indicated on a display of the device.

In one embodiment, the method according to the invention comprises the step of indicating to the user how to distance, center and/or align the wearable device with regard to the pattern of blood vessels before and/or during the capture of image frames for the initial biometric authentication.

In one embodiment, the method according to the invention comprises the step of extracting biometric features not only from a pattern of blood vessels, but also from different elements of the captured images frames.

In one embodiment, those additional biometric features depend on the 2D or 3D shape of the hand and/or of the wrist of the user. This allows a more secure authentication, by using more biometric features.

The 2D and/or 3D shape and dimension of the hand could be used to improve the capture of images frames. For example, if the 2D or 3D shape of the hand and/or of the wrist of the user is known, the capture of images frames during the initial biometric authentication can be more efficient as it is possible to precisely locate the device with respect to the user's hand or wrist.

The subsequent confirming step may be performed while the device is worn on the wrist. It may comprise for example:

confirming the initial authentication,
checking the liveness of the user, and/or
checking if the user still wears the device.

This confirming step may be executed continuously.

This confirming step may be executed at regular intervals.

This confirming step may be executed on demand. For example, if a user requests a transaction or an access to secure resources, its authentication may be verified, and revoked if the new image frame does not correspond to the user, or if the liveness of the user is not established.

Different transactions and different access requests may require different confidence level. Some less critical transactions or access requests may rely on the initial authentication step only; other, more demanding transaction or access requests may necessitate a confirming step, and various confidence levels for this confirmation.

The measure of a second portion of the user's hand or wrist during the confirming step may be taken with a second sensor.

In one embodiment, the step of confirming the authentication comprises making a new biometric authentication with a camera as a second sensor.

This camera may be a different camera, or the same camera than the one already used during the initial authentication step.

The new biometric authentication may be based on new image frames captured with the sensor at a close distance from the user's skin. This new capture being performed by the camera which captures the images at a first distance during the initial authentication, or by another camera of the wearable device, this another camera having a focal length and/or a field of view adapted to capture images frames at this second, close distance.

In one embodiment, the confirming step according to the invention comprises the checking if a least a part of the wrist-worn device is in contact with the user, e.g. with its skin.

The second sensor may be a light sensor which receives ambient light when the wearable device is at a distance from the user's hand or wrist, and which is obscured and does not receive light when the wearable device is resting on the user's hand or wrist.

The second sensor may be a galvanic sensor which measures the impedance of the user's skin, and which delivers a high impedance value when the wearable device is at a distance from the user's hand or wrist, and a lower impedance value when the wearable device is resting on the user's hand or wrist.

The second sensor may measure an electric field from the user's body, and which delivers a signal depending on its distance to the user's body.

The second sensor may include a capacitive plate to measure the capacitance between this plate and the user's skin.

The proximity and liveness detection may be based on an analysis of the video content of at least one captured image frame.

In one embodiment, the verification of the liveness of the user comprises checking changes in a series of captured images, for example verifying changes in successive frames from different positions in order to make sure that the hand or wrist is tridimensional, or detecting the circulation of blood or small movements of the skin between frames.

Verifying the liveness of the user comprises verifying at least one of the following parameters of the user, possibly with one of the followings second sensors:
 his temperature,
 his pulsations,
 his proximity to the wearable device.

If the wearable device comprises a clasp, the verifying step may comprise a verification that the clasp is closed. The verification may be revoked when the clasp is open.

A confirmation of authentication may be requested by the user. In one example, the user can press or rotate a button of the device or select an element of a graphical user interface of a touch display of the device, so as to confirm his authentication in order to finalize a payment or an access to secure resources. This confirmation may be based on a new image of the user.

In another embodiment, the user can press or rotate a button of an external device connected (in a wireless or wired way) with the wearable device, or tap on a touch display of this external device in order to initiate a confirmation of the initial authentication. In one preferred embodiment, this external device is a portable mobile device such as a smartphone, a laptop, etc.

If the confirmation of the authentication is not successful, for example if the liveness of the user is not confirmed, if the biometric features in the newly captured portion do not match the user with a sufficient probability, and/or if the user does not more wear the device, an action performed by using the device, e.g. a payment or an access to a secure resource, can be forbidden. Alternatively, a password or another confirmation of the user's identity may be requested.

In one embodiment, the method according to the invention comprises the step of checking if the user wears the device after the capturing step, e.g. 10 seconds after the initial authentication step, and before the confirming step.

For example, if the wearable device is a wrist-worn device comprising a clasp, the device can be configured so as to check if the user has closed the clasp after the end of capturing images of the pattern of blood vessels of the user, e.g. 10 seconds after the end of this capture.

In one embodiment, the method according to the invention comprises a supplementary authenticating step, this supplementary authenticating step comprising a verification of predetermined information known by the user.

In one embodiment, this predetermined information may be entered as:
 a password input on a display of the device,
 a sequence of pressures and/or drumming actions and/or tapping actions on a surface of the device,
 a gesture, such as a predetermined sequence of hands and arms displacements, detected by an inertial sensor of the device, and/or
 a voice signal, such as e.g. a password, a user selected information or a song, detected by an audio transducer of the device.

In this embodiment, the authentication of the user is even more reliable, as it is based on the same time on three parameters:
 Something the user has: in this case, the wearable device. As the device is worn by the user, the probability of loss or to have it stolen is lower than a portable mobile device as a smartphone or a laptop.
 Something the user is: in this case, biometric data such as his pattern of blood vessels.
 Something the user knows: in this case, the above-mentioned information (a password, a sequence of pressures and/or drumming actions and/or tapping actions and/or a voice signal and/or a gesture).

In a preferred embodiment, the method according to the invention comprises the step of improving the resolution and/or the contrast of the captured images.

In one embodiment, this improving can be performed by lightening the pattern of blood vessels, by varying this lightening, by tilting the camera and/or by using an IR camera for obtaining more information from the pattern of blood vessels.

The present invention concerns also a wearable device for authenticating a user, comprising:
 a camera for capturing images frames of a pattern of blood vessels of the user, said images frames covering a first portion of the user's hand or wrist;
 a first module for authenticating the user by matching biometric features extracted from those images frames with features extracted from reference images;
 a second module using image frames captured while the wearable device is worn for confirming the authentication, and/or verifying the liveness of the user.

In one embodiment, the first module comprises a computer vision software module.

As discussed, in preferred embodiments the wearable device according to the invention may be a wristwatch or a wrist strap. However, the present invention is not limited to those embodiments and the wearable device can be also a hand jewellery, e.g. a ring, or a clothing covering at least a part of a member of the user, e.g. a glove, a sock, or a shoe.

The present invention concerns also a computer program product for authenticating a user with images of his hand or wrist, the computer program product comprising computer code arranged for causing a wearable device to:
 authenticate the user by comparing biometric features extracted from images frames of a first portion of the user's wrist or hand,
 confirming the authentication and/or confirming the liveness of the user, based on subsequently captured images of a second portion of said user's hand or wrist, the surface of said second portion being smaller than the surface of said first portion.

According to one embodiment, the present invention concerns also a biometric sensor apparatus for authenticating a user using images frames of patterns of blood vessels of the user, comprising:
- a wrist strap,
- a clasp,
- a camera arranged for capturing said images;
- a mechanism for detecting an opening of said clasp, a module programmed for authenticating said user when said images match reference images of said user, and for revoking said authentication when an opening of the clasp has been detected.

According to an embodiment, the biometric sensor apparatus comprises a first said camera for capturing images of blood vessels before the closure of the clasp, a second camera for capturing images of wrist blood vessels when the wrist watch is worn.

According to an embodiment, the present invention concerns a method for authenticating a user, comprising:
- capturing images of patterns of blood vessels of the user with a camera mounted on a wrist strap,
- authenticating said user by comparing said images with reference images,
- detecting the opening of a clasp,
- revoking said authentication when an opening of the clasp has been detected.

According to another, independent embodiment, the invention is related to a method for authenticating the user of a wearable device comprising the steps of:
- entering in an authentication mode;
- using an inertial sensor of the device for detecting displacements of the wearable device when the user performs a test sequence of hands and arms displacements;
- comparing this sequence with a secrete reference sequence;
- authenticating the user if the test sequence matches the secret reference sequence.

The sequence of displacements may correspond for example to a series of letters, numbers or symbols defining a secret password.

BRIEF DESCRIPTION OF THE DRAWINGS

The invention will be better understood with the aid of the description of an embodiment given by way of example and illustrated by the Figures, in which.

DETAILED DESCRIPTION OF POSSIBLE EMBODIMENTS OF THE INVENTION

Figure 1:
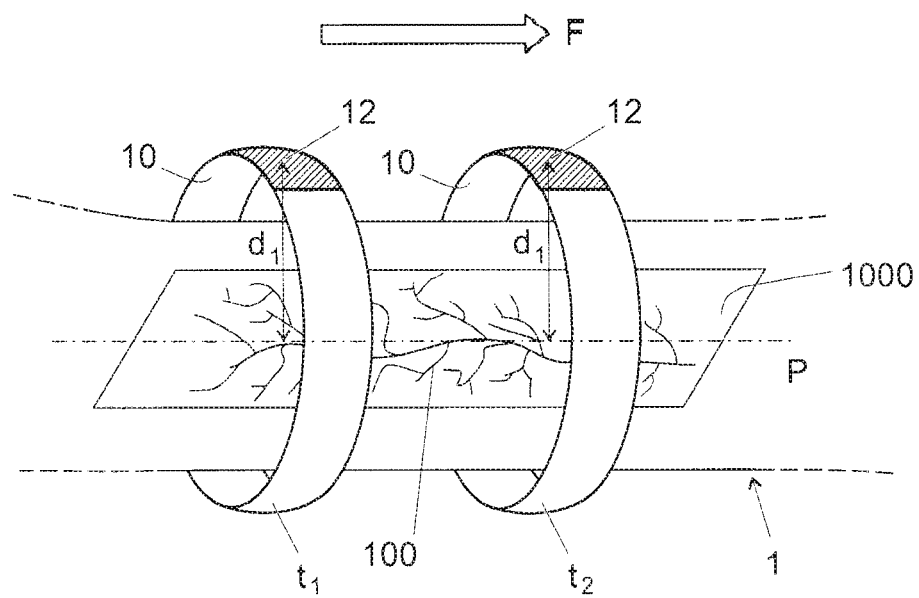
FIG. 1 shows a perspective view of a first example of how a sequence of images can be captured with an embodiment of the device according to the invention.

FIG. 1 shows a perspective view of a first example of how a sequence of images can be captured with an embodiment of a wearable device 10 according to the invention.

In FIG. 1, the device is a wrist-worn device, in this example an elastic wrist strap 10. However, it must be understood that the wearable device of the present invention is not limited to an elastic wrist strap. In fact, the wearable device could be a wrist strap comprising a clasp. The wearable device could also be a wristwatch, comprising an elastic wrist and/or comprising a wrist with a clasp. The wearable device 10 could be in alternative also a piece of hand jewelry, e.g. a ring, or a piece of clothing covering at least a part of a member of the user, e.g. a glove, a sock, or a shoe.

The wearable device of FIG. 1 comprises a camera 12, illustrated in a schematic way, on the elastic wrist strap 10. However, it must be understood that the present invention is not limited to a camera placed on the elastic wrist strap 10. In fact, if the wrist strap 10 can comprises a clasp, the camera 12 can be mounted on this clasp. The wrist strap 10 can comprise in addition or in alternative an auxiliary attachment: in this case, the camera 12 can be mounted on this auxiliary attachment.

In the case where the device 10 is a wristwatch, the camera 12 can be mounted on the case, on the dial, on the back, on the bezel and/or on a button of this wristwatch. In another embodiment, it is mounted on a clasp of the wristwatch. In still another embodiment, the wristwatch comprises an elastic wrist strap and the camera 12 can be mounted on this elastic wrist strap or on an auxiliary attachment of the wrist strap.

The camera 12 may be mounted and oriented so as to capture images of the back of the user's hand and/or of the back of the wrist when the wrist is enlarged or donned. Alternatively, the camera 12 may be mounted and oriented so as to capture images of the user's palm and/or of the inner side of the user's wrist when the wrist is enlarged or donned. A sequence of image frames comprising image frames of the back side and of the inner side of the hand and wrist may be captured by rotating the device.

An optical fibre may be provided as an accessory for transmitting light to the image sensor and capturing images from different portions of the user's skin at the other extremity of the optical fibre.

The camera 12 is configured so as to capture a sequence of images frames of the user's hand or wrist, imaging in particular a pattern of blood vessels 100. In one embodiment, the camera 12 is a pop-up camera.

In the illustrated example, the wearable device 10, and therefore its camera 12, is moved while it is capturing images frames of a portion of the user's body with the pattern of blood vessels 100, as indicated by the arrow F. In fact, the wearable device 10 in FIG. 1 is illustrated in a first position at the temporal instant t1, and the same wearable device 10 is illustrated in a second position different from the first at the temporal instant t2 after t1.

It must be understood that in FIG. 1 only two temporal instant t1 and t2 have been indicated. The temporal instant t2 follows t1, but it is not necessarily consecutive to t1 as other image frames may be captured between t1 and t2. between t1 and t2. The same applies to FIGS. 3 and 4.

In one embodiment, the user wearing the wearable device 10 moves it relative to his hand or wrist. In one preferred embodiment, he moves it while he is donning it. During this initial authentication step, the camera 12 is held at a distance d1 greater than 50 mm from the imaged portion of skin with a pattern of blood vessels 100.

The initial authentication step may be triggered automatically when the user is donning his device 10. A donning-detector (not shown) may be foreseen in order to detect that the user is donning the device. In one embodiment, an inertial sensor is used to detect a donning movement. Alternatively, a manipulation of the clasp characterizing a donning action may be detected to trigger an initial authentication. The initial authentication may also be triggered by an action of the user, for example a selection of a button or icon.

As illustrated in FIG. 1, the images frames of the pattern are captured when the camera 12 is at a first distance d1 from the imaged portion. In the context of the present invention, the distance between the camera 12 and the imaged portion corresponds to the length of the segment d1 connecting the center of the camera sensor 12 with the center of mass of the imaged portion of skin containing the pattern of blood vessels 100.

A distance d1 equal or higher than 50 mm can be obtained with a wearable device comprising an elastic wrist, so that it can be temporarily elongated and moved away from the imaged pattern of blood vessels 100. A distance d1 equal or higher than 50 mm can also be obtained if the wearable device comprises, in addition or in alternative, a clasp (not illustrated): when the clasp is open, so that the camera can be moved away from the wrist.

Capturing image frames when the camera 12 is at a distance from the user's body allows capturing a larger portion of the user's wrist and/or hand. Additionally, an even larger portion can be captured by stitching successive image frames, and/or extracting biometric features from different image frames covering different sub-portions of the user's wrist and/or hand.

This makes the matching of the images with a reference image more reliable, since it could be based on a larger pattern of blood vessels and a larger number of biometric features. Therefore, the authentication of the user is more reliable.

In the example of FIG. 1, the distance d1 at time t1 from the camera 12 to the pattern of blood vessels 100 is substantially the same at time t2. However, the present invention is not limited to this embodiment. In fact, in one preferred embodiment, the camera 12 is arranged so as to capture images frames from different distances (as illustrated in FIG. 3) and/or orientations (as illustrated in FIG. 4) with regard to the pattern of blood vessels 100.

Figure 3:
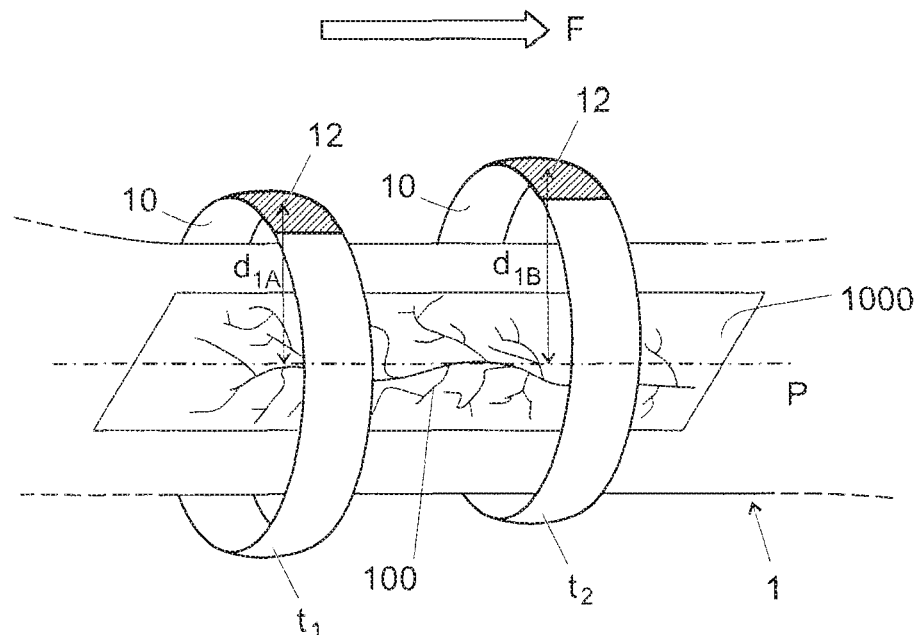
FIG. 3 shows a perspective view of a second example of how a sequence of images can be captured with an embodiment of the device according to the invention.

In the example of FIG. 3, the wearable device 10, and therefore its camera 12, is moved while it is capturing images of the pattern of blood vessels 100, as indicated by the arrow F. The device 10 in FIG. 3 is illustrated in a first position and at a distance d1A from the pattern of blood vessels 100 at time t1, and the same device 10 is illustrated in a second position different from the first and at a distance d1B from the pattern of blood vessels 100 different from d1A at time t2 after t1. Although in FIG. 3 d1B is larger than d1A, this embodiment is not limitative and d1B can be smaller than d1A.

Figure 4:
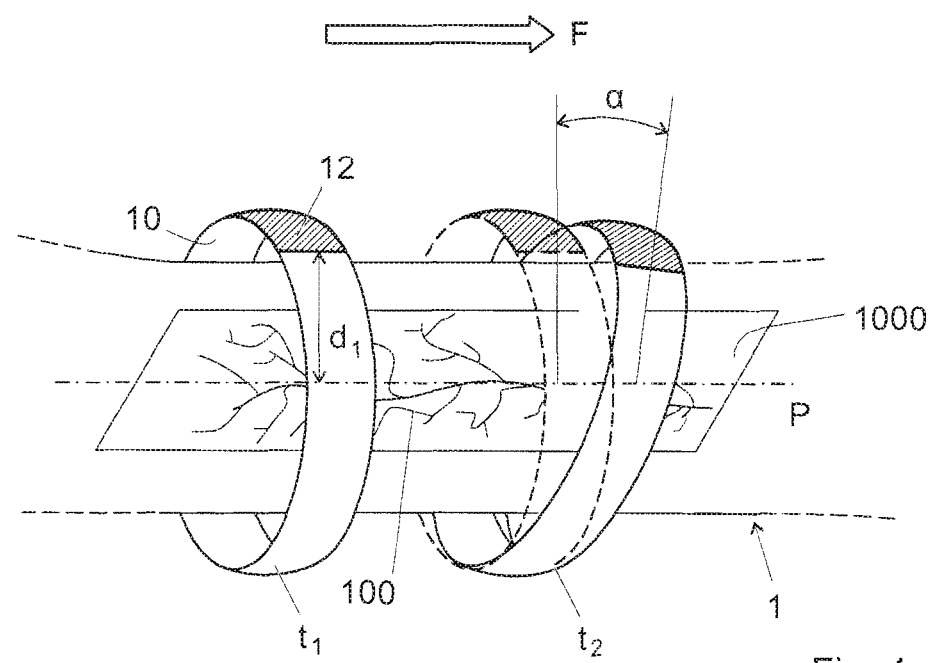
FIG. 4 shows a perspective view of a third example of how a sequence of images can be captured with an embodiment of the device according to the invention.

In the example of FIG. 4, the device 10, and therefore its camera 12, is moved while it is capturing images of the pattern of blood vessels 100, as indicated by the arrow F. In the same time, the device 10 is tilted by an angle α between the time t1 and t2.

The embodiment of FIG. 3 can be combined with the embodiment of FIG. 4, i.e. at t2 the device 10 can have a distance from the pattern of blood vessels and an orientation which are both different from the distance respectively orientation that the same device had at the previous temporal instant t1.

In one preferred embodiment, the camera 12 of the wearable device 10 allows a capture of focused images with different focal lengths and/or field of view. It can be a multi-focal camera. It can be a camera with a large depth of field.

In one preferred embodiment, the method according to the invention comprises the step of stitching images captured from different viewpoints.

The stitching may comprise adapting the orientation of at least some images, so that the orientation of multiple stitched images corresponds to each other and/or correspond to the orientation of the reference images. The stitching may also comprise adapting the size of at least some images. The stitching may also comprise adapting the brightness, contrast and/or white balance of at least some images.

The device 10 preferably comprises a computer vision software module (not illustrated) arranged so as to perform this stitching step.

In one embodiment, the method according to the invention comprises the step of indicating to the user, during or after the capturing step, that the capturing step has not been performed in an efficient way, for example that some portions have not been imaged, and/or that the quality of some image frames is not satisfactory.

In one example, the device 10 can comprise indicating means (not illustrated), such as a display, lightening means such as a LED, audio means and/or vibrating means indicating to the user that it is necessary to re-capture at least one image frame.

In another embodiment, the method according to the invention comprises a step of indicating to the user, during or after the capturing step, at least a portion of the pattern of blood vessels which needs to be imaged and/or at least a portion of the pattern of blood vessels which has not been captured, or not been captured with a sufficient quality, and which needs to be captured.

For example, the device 10 can comprise the already mentioned indicating means, or other indicating means, for indicating to the user one of the two above-mentioned portions. In one embodiment, the wearable device comprises brightening means, such as a display, a LED or a light source, illuminating the pertinent portion, for example by projecting light spots or circles projected on this portion. In one preferred embodiment, the device comprises audio means communicating to an audio signal indicating where it is necessary to capture or re-capture an image frame.

In another embodiment, the method according to the invention comprises the step of centering and/or aligning and/or distancing the camera 12 of the device 10 with regard to the pattern of blood vessels 100 before and/or during the initial authentication step.

In another embodiment, the method according to the invention comprises the step of indicating to the user how to distance, center and/or align the device 10 with regard to the pattern of blood vessels before and/or during the initial authentication step.

In another embodiment, user biometric features are extracted not only from the pattern of blood vessels 100, but also from different elements of the captured images frames.

In one preferred embodiment, biometric feature are extracted from the 2D or 3D shape of the hand and/or of the wrist of the user. This allows a more secure authentication, by using more biometric feature and/or by improving the capturing of images. For example, if the 2D or 3D shape of the hand and/or of the wrist of the user is known, the capture of images frames of the blood vessels can be more efficient as it is possible to precisely determine the position of the camera 12 with respect to the pattern of blood vessels. The shape and/or the dimensions of the hand may also be used for verifying which portions of the user's hand or wrist have been imaged, and if additional image frames are necessary in order to cover missing portions.

Figure 2A:
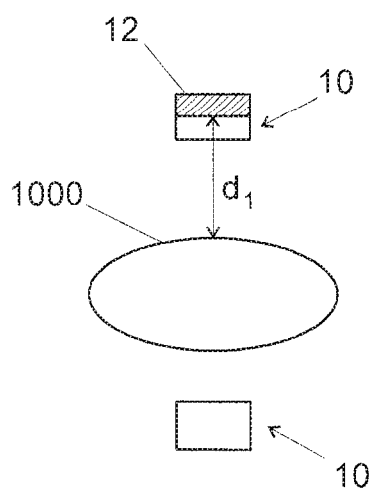
FIG. 2A shows a section view of an embodiment of the device according to the invention at a first distance from a pattern of blood vessels of a user.
Figure 2B:
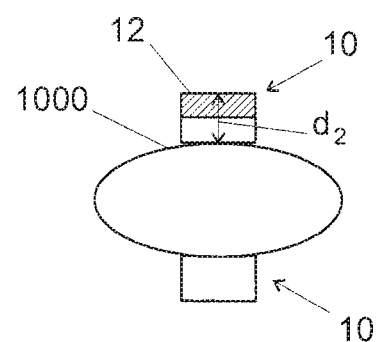
FIG. 2B shows a section view of an embodiment of the device according to the invention at a second distance from a pattern of blood vessels of a user.

After the initial authenticating step, at least one of the following steps is performed with the device 10 is at a second distance d2 (visible in one example on FIG. 2B) from the user's skin smaller than the first distance d1 (visible in one example on FIG. 2A):

confirming the authentication, and/or
checking the liveness of the user, and/or
checking if the user still wears the device 10.

According to one embodiment, this confirming step is executed while the user wears the device 10. In one embodiment, the second distance d2 is smaller than 10 mm, preferably smaller than 5 mm. In one preferred embodiment, the confirming step is executed when the device 10 is in contact with the skin of the user.

The authentication confirmation step, and/or the liveness verification step, may be executed continuously or at regular intervals or on demand. For example, if the user is requesting a transaction or an access to secure resources, a confirmation of the authentication may be requested by a transaction or access control software module. If the authentication is not confirmed, the transaction or the access is refused and the authentication is revoked.

In another embodiment, the user can press or rotate a button of an external device connected (in a wireless or wired way) with the wearable device 10, or tap on a touch display of this external device in order to initiate a request for payment or an access to secure resources. In one preferred embodiment, this external device is a portable mobile device as a smartphone, a laptop, etc.

A confirmation of the authentication, and/or a liveness detection, may also be repeated periodically, for example at regular intervals.

In one embodiment, the step of confirming the authentication comprises capturing new images frames of patterns of blood vessels of the user while the camera 12 is at a second distance d2 from the blood vessels, this new capture being performed by the camera which captures the images at a first distance d1, or by an additional camera of the wearable device 10.

This additional camera may have a shorter focal length and/or a more limited field of view than the first camera used during the initial authentication step. It is adapted to capture images frames at this second distance d2.

The additional camera may be oriented differently than the first camera 12 used during the initial authentication. In one embodiment, the additional camera is on the inner side of the wrist or on the back of the watch, in order to capture images from the outer side respectively from the inner side of the wrist, from a short distance.

The confirming step may use a different sensor than the camera 12.

In one embodiment, the confirming step according to the invention comprises a verification that at least a part of the wearable device 10 is in contact with the user, e.g. with its skin. This verification can comprise performing a galvanic measure, e.g. measuring the user's skin galvanic signature. This check can comprise performing in addition or in alternative a brightness measure and/or an image content analysis of at least one image captured when the device is worn. This verification may comprise a measure of the electric field emitted by the user's body. The second sensor may include a capacitive plate to measure the capacity between this plate and the user's body.

The confirming step may comprise a verification that the device is constantly worn. For example, the authentication may be revoked if a clasp of the wrist-worn device is open.

In one embodiment checking the liveness of the user comprises checking changes in the captured multiple images and/or checking at least one of the following parameters of the user:

his body temperature,
his pulsations,
his proximity to the wearable device 10.

If the new authentication is not successful, if the images do not correspond to a living user and/or if the user does not more wear the device, an action performed by using the wearable device, e.g. a payment or an access to a secure resource, can be forbidden.

In another embodiment, the method according to the invention comprises a step of checking if the user wears the device 10 after the initial authentication step, e.g. seconds after the capturing step, and before the confirming step.

For example, if the device 10 comprises a clasp, a software may check if the user has closed the clasp within a time limit after the end of capturing images of the pattern of blood vessels of the user, for example within 10 seconds after the end of this capture. The authentication is revoked if a closure of the clasp, or a direct contact of the device with the skin, is not detected.

In a preferred embodiment, the method according to the invention comprises a supplementary authenticating step, this supplementary authenticating step comprising verifying the knowledge of a predetermined piece of information.

In one embodiment, this predetermined information may be entered as:

a password input on the wearable device 10,
a sequence of pressures and/or drumming actions and/or tapping actions on a display of the wearable device 10,
a hand or arm gesture detected by an inertial sensor of the wearable device 10, and/or
a voice signal, e.g. a song, detected by an audio transducer of the device.

In one example, when the wearable device is in authentication mode during the confirmation step, an inertial sensor of the device detects a test sequence of hands and arms displacements. A processor then compares this sequence with a secrete reference sequence, and authenticates the user (or confirms his authentication) if the test sequence matches the secret reference sequence.

The sequence of displacements may correspond for example to a series of letters, numbers or symbols defining a secret password.

In this embodiment, the authentication of the user is even more reliable as it is based on the three parameters:

Something the user has: in this case, the wearable device 10.
Something the user is: in this case, his biometric feature such as his pattern of blood vessels 100.
Something the user knows, such as a password, a sequence of pressures and/or drumming actions and/or tapping actions and/or a gesture and/or a voice signal).

The invention claimed is:

1. A method for authenticating a user of a wearable device, comprising:

an initial biometric authentication of the user, based on biometric features extracted from one or a plurality of image frames corresponding to a first portion of the user's hand or wrist or to a first portion of the user's hand and wrist, captured with a camera of the wearable device;

a subsequent step of confirming said biometric authentication of the user based on one or a plurality of image frames captured with a camera of the wearable device and corresponding to a second portion of the user's hand or wrist taken when said wearable device is worn in contact with the user's hand or wrist;

wherein the initial biometric authentication is performed by temporarily moving the camera away from said first portion of the user's hand or wrist.

2. The method of claim 1, said initial biometric authentication being performed while the user is donning the wearable device.

3. The method of claim 2, comprising a detection that the user is donning the wearable device, said initial biometric authentication being triggered by said detection.

4. The method of claim 2, said initial biometric authentication comprising a step of stitching a plurality of image frames captured from different viewpoints.

5. The method of claim 4, at least some of said biometric features being extracted from a pattern of blood vessels in said user's hand or wrist.

6. The method of claim 5, comprising a step of determining the shape or dimensions of the user's hand or wrist, and verifying the position of said image frame.

7. The method of claim 5, at least some of said biometric features being extracted from the skin texture or dimension or shape of said user's hand or wrist.

8. The method of claim 1, further comprising the step of:
prompting said user to temporarily move said wearable device away from the user's hand or wrist before performing said initial biometric authentication.

9. The method of claim 1, said confirming step being executed continuously or at regular intervals.

10. The method of claim 1, said confirming step being initiated by a transaction or access request.

11. The method of claim 1, at least some said images frames being captured during said initial step from a first distance from the user's hand or wrist, the confirming step being based on captured measure from a second distance from the user's hand or wrist.

12. The method of claim 11, said first distance being larger than 10 mm, said second distance being less than 5 mm.

13. The method of claim 11, wherein the measure of a second portion of the user's hand or wrist is performed using a second camera having a focal length or field of view adapted to capture image frames at the second distance.

14. The method of claim 1, comprising:
after the initial authentication step, and before the confirming step, verifying if the user wears the wearable device.

15. The method of claim 1, comprising a supplementary authenticating step to verify if the user knows a predetermined information, said predetermined information comprising:
a password entered on the wearable device,
a sequence of pressures or drumming actions or tapping actions entered on a display the wearable device,
a hand or arm gesture detected by an inertial sensor of the wearable device, or
a voice signal detected by an audio transducer of the wearable device.

16. The method of claim 1, further comprising a liveness verification, wherein said confirming or liveness verification is based on a measurement by a second sensor, the second sensor being one of: a light sensor, a galvanic sensor, an electric field sensor, a capacitive plate sensor, a video captor, a temperature sensor, a pulse sensor or a proximity sensor.

17. The method of claim 1, wherein said initial authentication is performed by capturing the plurality of images while moving the camera over the first portion of the user's hand or wrist or hand and wrist.

18. The method claim 1, further comprising detecting by a separate donning detector that the wearable device is being donned, and performing the initial biometric authentication in response to detecting that the wearable device is being donned.

19. The method of claim 18, wherein the donning detector is non-biologic.

20. A method for authenticating a user of a wearable device, comprising:
detecting when the user is donning the wearable device;
in response to the detection, performing an initial biometric authentication of the user, based on biometric features extracted from one or a plurality of image frames corresponding to a first portion of the user's hand or wrist or to a first portion of the user's hand and wrist, captured with a camera of a wearable device at a first distance from the wrist;
a subsequent step of confirming said biometric authentication of the user based on one or a plurality of image frames captured with a camera of the wearable device and corresponding to of a second portion of the user's hand or wrist taken when said wearable device is worn in contact with the user's hand or wrist at a second distance from said wrist.

21. A method for authenticating a user of a wearable device, comprising:
prompting said user to temporarily move said wearable device away from the user's hand or wrist;
moving said wearable device away from the user's hand or wrist;
performing an initial biometric authentication of the user when said wearable device is away from the user's hand or wrist, said biometric authentication being based on biometric features extracted from one or a plurality of image frames corresponding to a first portion of the user's hand or wrist or to a first portion of the user's hand and wrist, captured with a camera of a wearable device at a first distance from said wrist;
performing a subsequent step of confirming said biometric authentication of the user based on one or a plurality of image frames captured with a camera of the wearable device and corresponding to of a second portion of the user's hand or wrist taken when said wearable device is worn in contact with the user's hand or wrist at a second distance from said wrist.

22. A wearable device for authenticating a user, comprising:
at least one camera for capturing first image frames of a first portion of a user's hand or wrist from a first distance when the user is donning the wearable device or holding at least a part of the wearable device away from his hand or wrist;
a sensor for measuring a second portion of said hand or wrist, when the user is wearing the device and the device is in contact with the user's hand or wrist or hand and wrist;
a first module for authenticating the user based on biometric features extracted from one or a plurality of the first image frames;

a second module for confirming the biometric authentication of the user based on one or a plurality of image frames from said sensor,
wherein the sensor is arranged to measure the second portion when the sensor is closer to the second portion than the camera is to the first portion when the first images frames are captured.

23. The wearable device of claim 22, said wearable device being a wrist watch and wherein said camera is mounted on a case, on a dial of a watch, on a bezel or on a button of the wrist watch,
said at least one camera being arranged so as to capture focused images in a range from 0.5 to 50 mm at least.

24. The method according to claim 22, wherein the second sensor is chosen from a set comprising a light sensor, a galvanic sensor, an electric field sensor, a capacitive sensor, a proximity sensor, a temperature sensor and a pulse monitor.

25. A non-transitory computer readable medium storing instructions that, when executed on a wearable device, provide for authenticating a user with images of his hand or wrist, by causing the wearable device to:
authenticate the user by comparing biometric features extracted from images frames of a first portion of the user's wrist or hand, taken using a camera of the wearable device,
confirm the authentication based on a subsequent one or a plurality of image frames captured with a camera of the wearable device and corresponding to a second portion of said user's hand or wrist when a part of the wearable device is in contact with the user's hand or wrist or hand and wrist
wherein the authentication is performed while temporarily moving the camera away from the first portion of the user's hand or wrist.

* * * * *